(12) United States Patent
Humphreys

(10) Patent No.: US 8,499,785 B2
(45) Date of Patent: Aug. 6, 2013

(54) OVERFLOW VALVE FOR PREVENTION OF WATER VAPOR LOSS

(75) Inventor: Michael Humphreys, Nanjing (CN)

(73) Assignee: Apricus Inc, Branford, CT (US)

( * ) Notice: Subject to any disclaimer, the term of this patent is extended or adjusted under 35 U.S.C. 154(b) by 352 days.

(21) Appl. No.: 13/009,230

(22) Filed: Jan. 19, 2011

(65) Prior Publication Data

US 2012/0180881 A1    Jul. 19, 2012

(51) Int. Cl.
*F16K 21/18* (2006.01)

(52) U.S. Cl.
USPC .............. 137/398; 137/448; 251/298; 405/96

(58) Field of Classification Search
USPC .................. 137/204, 101.25, 101.27, 101.29, 137/183, 187, 188, 189, 192, 448, 578, 579, 137/247.19, 409, 395–398; 251/298–301; 405/94, 96, 99; 73/322.5
See application file for complete search history.

(56) References Cited

U.S. PATENT DOCUMENTS

| | | | | |
|---|---|---|---|---|
| 105,503 A * | 7/1870 | Smith | | 251/299 |
| 152,826 A * | 7/1874 | Fosket et al. | | 137/192 |
| 187,181 A * | 2/1877 | Schmitz | | 137/448 |
| 199,696 A * | 1/1878 | Dikeman | | 137/448 |
| 311,113 A * | 1/1885 | Fosket | | 137/192 |
| 417,171 A * | 12/1889 | Gray, Jr. | | 137/192 |
| 787,366 A * | 4/1905 | French | | 137/192 |
| 897,285 A * | 9/1908 | Greenaway | | 137/204 |
| 922,142 A | 5/1909 | Hogg | | |
| 1,067,610 A * | 7/1913 | Ibbeken | | 137/247.19 |
| 2,211,296 A | 8/1940 | Shaft | | |
| 2,292,509 A | 8/1942 | Carson | | |
| 2,655,121 A * | 10/1953 | Cuneo | | 251/299 |
| 2,838,065 A * | 6/1958 | Held et al. | | 137/527.6 |
| 3,067,879 A * | 12/1962 | Baker | | 137/448 |
| 3,279,491 A * | 10/1966 | Brady | | 137/192 |
| 3,330,292 A * | 7/1967 | Lansky | | 137/445 |
| 3,351,281 A * | 11/1967 | Keil | | 137/173 |
| 3,709,202 A | 1/1973 | Brown | | |
| 3,838,706 A * | 10/1974 | Klenk et al. | | 137/247.19 |
| 3,974,654 A * | 8/1976 | Mirto, Jr. | | 137/409 |
| 4,215,716 A * | 8/1980 | Klenk et al. | | 137/247.19 |
| 4,527,584 A * | 7/1985 | Miller | | 137/192 |
| 4,640,307 A | 2/1987 | Roberts | | |
| 5,406,972 A * | 4/1995 | Coscarella et al. | | 137/409 |
| 6,318,404 B2 * | 11/2001 | Coscarella | | 137/409 |
| 6,527,006 B2 * | 3/2003 | Jackson | | 137/527.6 |
| 7,426,979 B2 * | 9/2008 | Nagai | | 137/527.6 |

* cited by examiner

*Primary Examiner* — Craig Schneider
*Assistant Examiner* — Craig J Price
(74) *Attorney, Agent, or Firm* — St. Onge Steward Johnston & Reens LLC

(57) ABSTRACT

A system and valve for regulating the level of a fluid. The valve having a floating head member that is connected via a rotatable member to a drain member, where fluid may drain from the valve. The system having the valve and a tank, where the fluid drains from the tank once the fluid level reaches the level of the drain member of the valve.

24 Claims, 3 Drawing Sheets

OVERFLOW VALVE FOR PREVENTION OF WATER VAPOR LOSS

FIELD OF THE INVENTION

The present invention relates to a valve for regulating the level of a fluid and for prevention of water vapor loss from a multi-purpose water storage tank.

BACKGROUND OF THE INVENTION

Hot water storage tanks are used to provide and circulate hot water throughout a plumbing system. Hot water storage tanks may include a port at a designated height on the tank to allow for excess water to exit the tank. It is desirable to allow water to exit the tank to prevent excess water from accumulating in the tank, as the excess water can overflow out the top of the tank, may lose temperature quickly, and may cause corrosion problems, as the water may leak and/or cause the tank to rust.

Valves currently used for water level overflow control typically employ a large float arm that is attached to a valve. When the water level rises, the float rises, causing the arm to rotate. This rotation causes the valve to open and allows water to escape the tank. These float arm devices are large and require a large height change in water for the ball to rise enough to in turn fully open or close the valve. This may lead to the valve being left open for longer than desired and may cause excessive water to be lost, including water vapor loss. As water vapor is at a higher temperature than its corresponding liquid (it is in the vapor state, which is a higher energy than a liquid state), excess loss of water vapor and energy results in heat loss from the tank that decreases the overall efficiency of the hot water storage device.

Furthermore, many of the float arm systems employed in the prior art use electromagnetic valves or valves with sealing faces. In the case of a non-pressurized tank, a fully sealed valve may not be desirable when there are no other means of exposure to the outside atmosphere.

Various valve mechanisms are known and have been employed in various tanks. U.S. Pat. No. 4,640,307 ("the '307 patent") to Roberts discloses a float valve mechanism for a hot water tank. The '307 patent provides a valve member cover that is connected to a lever. However, the lever has a groove, which is always open, such that water vapor from the tank will exit the tank and cause the overall efficiency of the tank to not be maximized. Furthermore, the '307 patent suffers from being large and requiring a large height change in the water.

In another example of a drainage system, U.S. Pat. No. 3,709,202 to Brown ("the '202 patent") discloses a crankcase draining recycling system having a valve operable by a float in the drainage tank. U.S. Pat. No. 2,292,509 to Carson ("the '509 patent") discloses an automatic valve for liquid containers having a disc valve connected to a flange and bifurcated lever. U.S. Pat. No. 2,211,296 to Shaft ("the '296 patent") disclosed an automatic ball float tank seal that forms a seal once the water level reaches the desired level. U.S. Pat. No. 922,142 to Hogg ("the '142 patent") discloses an automatic pipeline suction valve having a float that keeps the valve open so long as the float maintaining depth is maintained.

Other designs that have been used for water level overflow control employ an electromagnetic valve, which adds cost and complexity to the system. Electromagnetic valves require an electrical supply to operate correctly, resulting in additional energy consumption and decreasing the overall efficiency of the hot water storage system.

In the aforementioned prior art patents, the problem of preventing excessive water from being lost, including water vapor loss, is not solved. Moreover, the prior art does not solve the problem of designing a valve that quickly, accurately and reliably opens to allow water to exit the drain port once water reaches a certain level, which is small, simple and has a low cost.

It is therefore desired to provide an overflow valve that overcomes the drawbacks of the prior art by quickly, accurately and reliably opening the overflow valve to allow water to exit the drain port once the water reaches a certain level.

It is further desired to minimize water vapor loss while the valve is in the closed position and to minimize high energy water vapor loss in general.

It is further desired for a valve to allow for external air intake should negative pressure in the tank occur, so that the pressure in the tank can be stabilized.

It is yet further desired to minimize heat loss from the tank through the valve and valve assembly.

SUMMARY OF THE INVENTION

The present invention overcomes the drawbacks of the prior art by allowing the valve to open when the water level rises above the level of the bottom of the drain member port. Objectives of the present invention include allowing a valve to open once the water height exceeds the bottom of the drain member, allowing for unrestricted water flow through the drain member.

Other objectives of the invention allow for small changes in the water level allowing the water or fluid to exit through the drain port or drain member.

Other objectives of the invention are to minimize water vapor loss while the valve is in the closed position.

Other objectives of the invention are to allow for air intake should negative pressure in the tank occur, so that the pressure in the tank can be stabilized. Other objectives are to minimize heat loss from the tank through the valve and valve assembly.

Some objectives of the present invention are achieved by providing a valve for regulating the level of a fluid comprising: a head member having a proximal end and a distal end, a drain member having a proximal end and a distal end; and a rotatable member, the rotatable member connecting the head member to the drain member, wherein when the valve is in a closed position, the head member has its distal end flush against the proximal end of the drain member, and wherein when the valve is in the open position, a space is formed between the distal end of the head member and the proximal end of the drain member allowing the fluid to enter the drain member, such that when the fluid reaches the level of the bottom of the drain member, the head member begins to rotate via the rotatable member and allows the fluid to enter the drain member.

The head member may have a hollow shape. A seal may be formed by the distal end of the head member being flush against the proximal end of the drain member when the valve is in the closed position. Also when the valve is in the closed position, the level of the fluid may be below the level of the bottom of the drain member.

In certain embodiments, the valve may be in the closed position when the fluid is below the level of the bottom of the drain member. In other embodiments, the valve may be in the open position when the fluid reaches the level of the bottom of the drain member, such that when the fluid reaches the level of the bottom of the drain member, the head member rotates via the rotatable member and allows the fluid to enter the drain member.

The upward pressure of the fluid may allow the head member to rotate via the rotatable member. The head member may have a lower density than the fluid. The combined density of the head member and air may be less than the fluid. When the valve is in the closed position, the valve may reduce water vapor loss.

In certain embodiments, the rotatable member may connect the top of the distal end of the head member to the top of the proximal end of the drain member.

In certain embodiments, the fluid and the vale may be located in a tank. The distal end of the drain member may be attached to a side wall of the tank, such that the fluid, when it reaches the level of the bottom of the drain member, drains through the drain member and exits the tank. The distal end of the drain member may be exposed out of the tank. The tank may comprise air and/or fluid. The tank may hold water vapor within the tank.

In certain embodiments, the drain member may be hollow. The rotatable member may be selected from a group consisting of a hinge, a joint, a ball joint, a pivot, or a bearing.

In certain embodiments, the valve may be made from a group consisting of polypropylene, a plastic, a polymer, or a combination thereof. The head member may have a hollow body.

The valve may have a volume to weight ratio, the volume to weight ratio allowing the valve to float on top of the fluid once the fluid reaches the level of the bottom of the drain member.

In certain embodiments, when valve is open, the fluid may freely enter the drain member without restriction. When the air in the tank provides a negative pressure, the valve may enter the open position, allowing air that is external to the tank to enter the drain via the drain member and to enter the inside of the tank.

In certain embodiments, the valve may float on the fluid when the fluid reaches the level of the bottom of the drain member.

Other objectives of the invention are achieved by providing a valve for regulating the level of a fluid comprising: drain member having a proximal end and an exit port; and a head member having a hinged top, the hinged top connected to the drain member, wherein when the valve is in a closed position, the head member has its distal end flush against the proximal end of the drain member, and wherein when the valve is in an open position, a space is formed between the distal end of the head member and the proximal end of the drain member allowing the fluid to enter the drain member; wherein the valve enters the open position when the fluid reaches the level of the bottom of the drain member, such that the upward pressure pushes against the head member and rotates the head member, allowing the fluid to enter the drain member and exit the valve via the exit port.

The valve may be made from polypropylene, and may have a hollow body. The head member may have a volume to weight ratio, the volume to weight ratio allowing the head member to float once the fluid reaches the level of the bottom of the drain member.

Other objectives of the invention are achieved by providing a system for regulating the level of a fluid comprising: a tank for containing the fluid; and a valve, the valve comprising: a head member having a proximal end and a distal end, a drain member having a proximal end and a distal end; and a rotatable member, the rotatable member connecting the head member to the drain member; and wherein when the fluid is below the level of the bottom of the drain member, the valve is in the closed position, and the head member has its distal end flush against the proximal end of the drain member and wherein when the fluid reaches the level of the bottom of the drain member, the valve is in the open position and a space is formed between the distal end of the head member and the proximal end of the drain member allowing the fluid to enter the drain member. The tank may have an input and an output (not shown) to allow the fluid to enter and exit the tank.

When the valve in the system is in the closed position, the system may reduce water vapor loss from the tank. The valve in the system may have a volume to weight ratio, the volume to weight ratio allowing the valve to float on top of the fluid once the fluid reaches the level of the bottom of the drain member.

In certain embodiments, the distal end of the drain member of the valve in the system may be attached to the side of the tank, such that the fluid, when it reaches the level of the bottom of the drain member, drains through the drain member and exits the tank. When the valve is in the open position, the fluid may freely enter the drain member and may exit the tank without restriction.

Other objects of the invention and its particular features and advantages will become more apparent from consideration of the following drawings and accompanying detailed description. It should be understood that the detailed description and specific examples, while indicating the preferred embodiment of the invention, are intended for purposes of illustration only and are not intended to limit the scope of the invention.

DETAILED DESCRIPTION OF THE INVENTION

Figure 1:
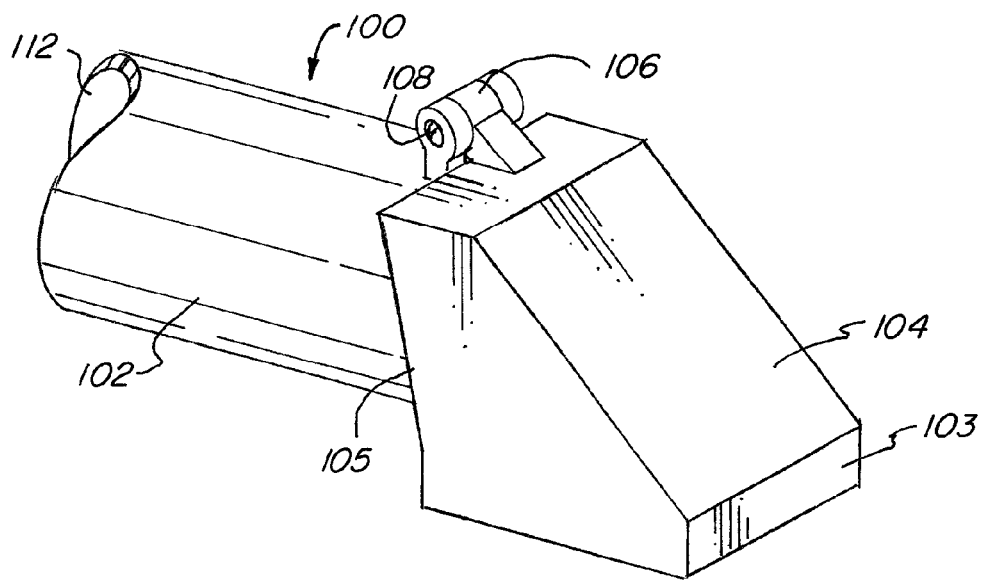
FIG. 1 is an assembled view of the valve of an embodiment of the present invention.
Figure 1A:
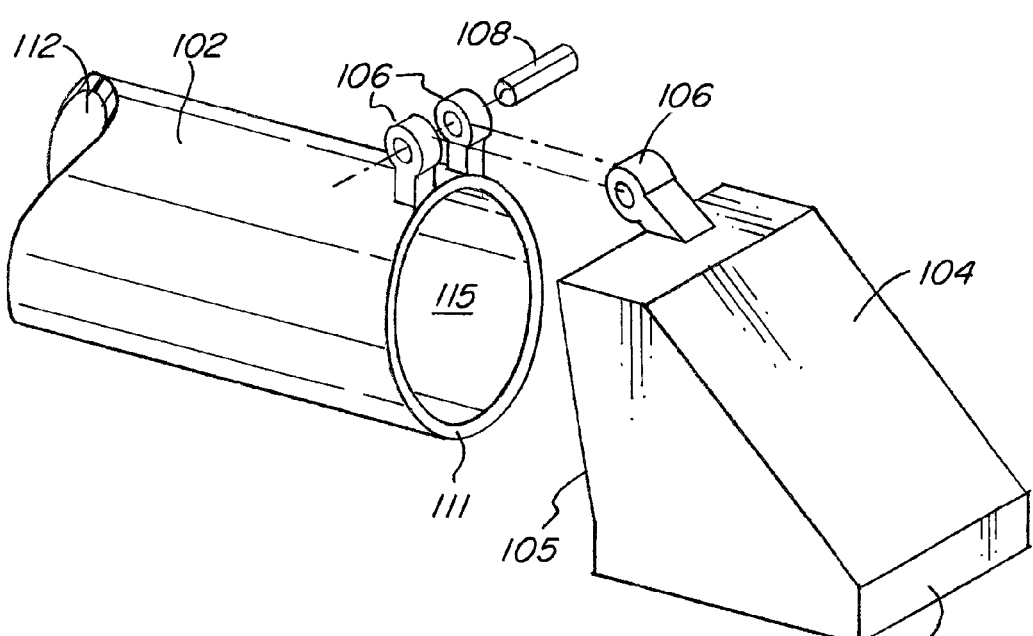
FIG. 1A is an exploded view of the valve of FIG. 1.

FIG. 1 shows an assembled view of valve of an embodiment of the present invention. FIG. 1A shows an exploded view of the valve of FIG. 1. FIG. 1 provides head member 104 and rotatable member 106/108. The rotatable member 106/108 may be manufactured and fused into the head member or may be manufactured as a separate element from the head member 104. FIG. 1 also provides a drain member 102. When closed, the head member 104 rests on the drain member 102, closing the overflow valve and reducing vapor loss. In certain embodiments, the head member is a one-piece hollow polygonal body.

More specifically, head member 104 has a proximal end 103 and a distal end 105. The drain member 102 has a proximal end 111 and a distal end 112. As shown, the distal end of the head member 105 rests on the proximal end of the drain member 111. In certain embodiments, the distal end of the drain member 111 (also known as a drain port), is tapered, so that the distal end of the head member 105 rests on the proximal end of the drain member 111. In other embodiments, the drain member 110 has a hollow body 115 (also known as a hollow core).

In the embodiment shown in FIG. 1, the head member 104 has a hollow body. This allows it to have a volume to weight ratio that allows the valve to float on top of the fluid once the fluid reaches the level of the bottom of the drain member. The head member 104 has a trapezoidal shape as shown, however, in other embodiments; the shape of the head member may differ. Other possible shapes include the head member 104 having an oblong or circular shape. The drain member 102 is shown having a cylindrical shape, but it may be rectangular, oblong, egg shaped, or spherical in other embodiments.

FIG. 1 shows the rotatable member 106/108 as a hinge. Here, a pin 108 is shown as being able to wedge between receiver(s) 106 to form the hinge. However, rotatable member 106/108 may also be a joint, a ball joint, a pivot, or a bearing, or any other such rotatable connection system known in the art.

Figure 2:
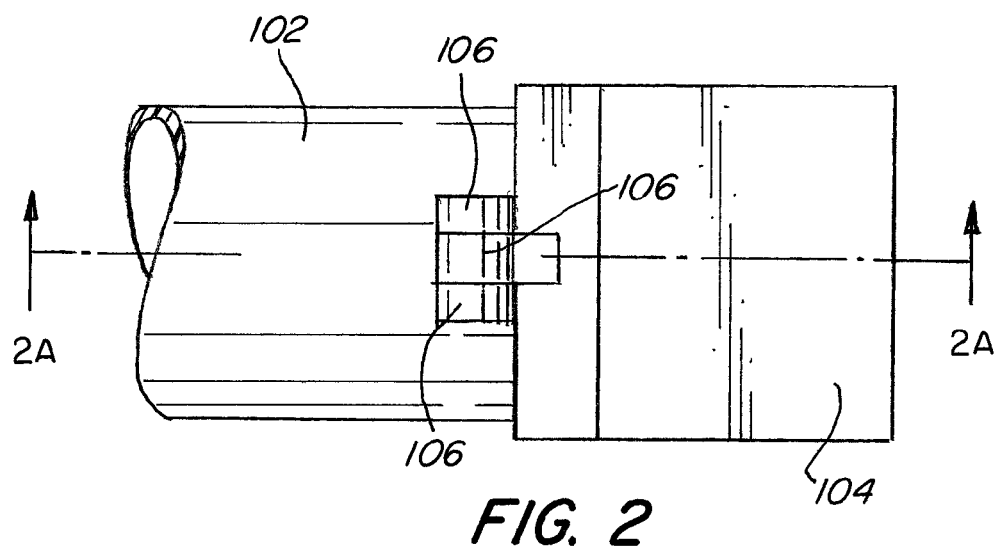
FIG. 2 is a top view of the valve of FIG. 1.

FIG. 2 shows a top view of embodiment of FIG. 1. The head member 104 is shown with a central air pocket (hollow body) 114 with a rotatable member 106/108 attached to the drain member 102. The head member 104 may rotate about the rotatable member 106/108 to allow the valve 100 to open.

Figure 2A:
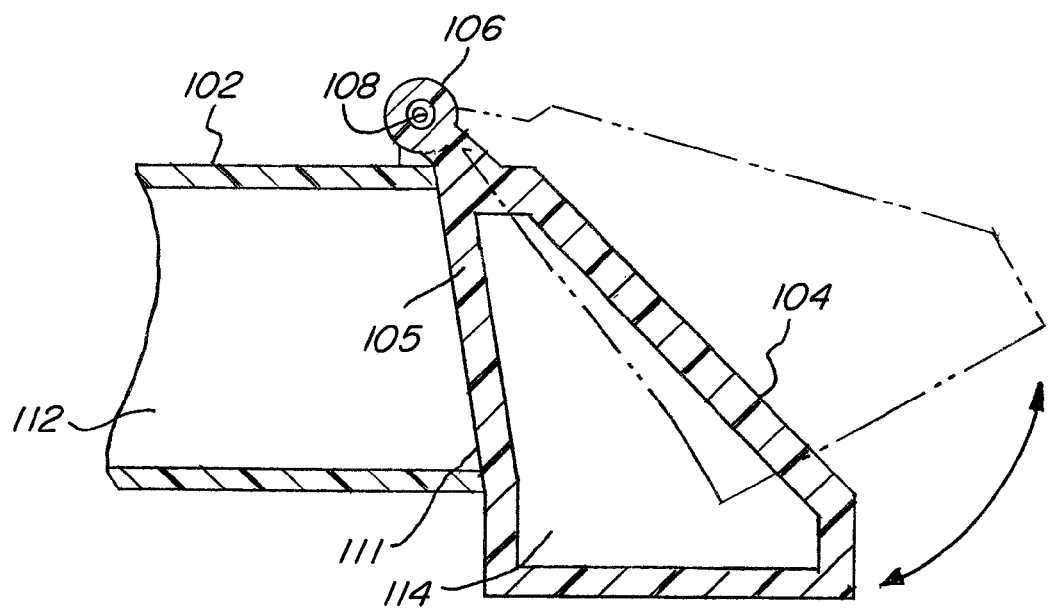
FIG. 2A is a side view of the valve of FIG. 1.

FIG. 2A shows a side view of the embodiment of FIG. 1. The head member 104 is shown in both open and closed position (open position being in phantom). The head member 104 is shown attached to the drain member 102 via rotatable member 106/108. The proximal end of the drain member 111 is also shown being flush against the distal end of the head member 105.

Figure 3A:
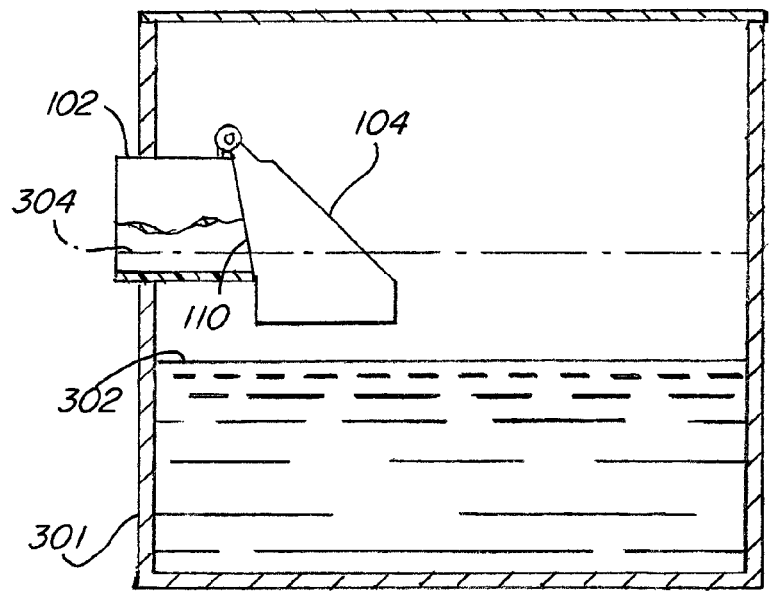
FIG. 3A is a sectional view of a tank with the valve of FIG. 1 in the closed position.

FIG. 3A shows a sectional view of a tank with the overflow valve installed and in the closed position. Tank 301 has a water level 302. The head member 102 has a drain level 304 and the drain member 102 is installed on the tank 301, such that the distal end 112 of the drain member 102 is fixed to the tank 301. When the water level 302 is below the bottom of the level of the drain member 102, the head member 104 is in contact with the drain member 102, closing the valve 100 and reducing vapor loss.

Figure 3B:
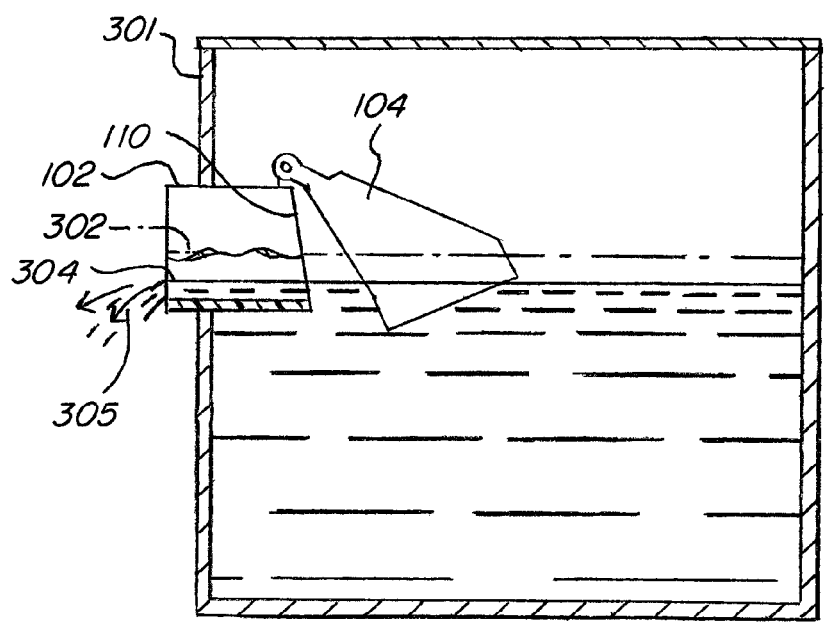
FIG. 3B is a sectional view of a tank with the valve of FIG. 1 in the open position.

FIG. 3B shows a sectional view of tank 301 with the head member 102 installed and in the open position. Tank 301 has a water level 302. The drain member 102 has a drain level 304 and the drain member 102 is installed on the tank 301, such that the distal end 112 of the drain member 102 is fixed to the tank 301. When the water level 302 is above the bottom of the level 304 of the drain member level 102, the head member 104 floats, and is not in contact with the drain member 102. This opens the valve 100, allowing water to escape from the tank 305.

Other embodiments (not shown) may involve the drain member 102 being rectangular, oblong, egg shaped, or spherical. Other embodiments may involve having the rotatable member 106/108 be a joint, a ball joint, a pivot, or a bearing, or any other such rotatable connection system known in the art.

Other embodiments may have the head member 104 be trapezoidal, circular, or rectangular.

Other embodiments may involve the head member 104 and drain member 102 be connected by the rotatable member 106/108, where the rotatable member attaches these two elements together at the middle of the length of the drain member 102, such that the head member 104 extends over the drain member 102.

While the invention has been specifically described in connection with certain specific embodiments thereof, it is to be understood that this is by way of illustration and not of limitation and that various changes and modifications in form and details may be made thereto, and the scope of the appended claims should be construed as broadly as the prior art will permit.

The description of the invention is merely exemplary in nature, and thus, variations that do not depart from the gist of the invention are intended to be within the scope of the invention. Such variations are not to be regarded as a departure from the spirit and scope of the invention.

What is claimed is:

1. A valve for regulating a level of a fluid in a hot water tank, the valve comprising:
    a head member having a proximal end and a distal end, the head member being a one-piece hollow polygonal body,
    a drain member having a proximal end and a distal end; and
    a rotatable member, said rotatable member connecting said head member to said drain member,
    wherein when the valve is in a closed position, the head member has its distal end flush against the proximal end of the drain member, and
    wherein when the valve is in an open position, a space is formed between the distal end of the head member and the proximal end of the drain member allowing the fluid to enter the drain member,
    such that when the fluid reaches the level of a bottom of the drain member, the head member begins to rotate via the rotatable member and allows the fluid to enter the drain member.

2. The valve of claim 1, wherein a seal is formed by the distal end of the head member being flush against the proximal end of the drain member when the valve is in the closed position.

3. The valve of claim 1, wherein the valve is in the closed position when the level of the fluid is below the level of the bottom of the drain member.

4. The valve of claim 3, wherein an upward pressure of the fluid allows the head member to rotate via the rotatable member.

5. The valve of claim 1, wherein when in the closed position, the valve reduces water vapor loss.

6. The valve of claim 1, wherein the rotatable member connects a top of the distal end of the head member to the top of the proximal end of the drain member.

7. The valve of claim 1, wherein said fluid is located in a tank.

8. The valve of claim 7, wherein the distal end of the drain member is attached to a side wall of the tank, such that the fluid, when the fluid reaches the level of the bottom of the drain member, drains through the drain member and exits the tank.

9. The valve of claim 1, wherein the drain member is hollow.

10. The valve of claim 1, wherein said rotatable member is selected from a group consisting of a hinge, a joint, a ball joint, a pivot, or a bearing.

11. The valve of claim 1, wherein the valve is made from a group consisting of polypropylene, a plastic, a polymer, or a combination thereof.

12. The valve of claim 1, wherein the valve has a volume to weight ratio, said volume to weight ratio allowing the valve to float on top of the fluid once the fluid reaches the level of the bottom of the drain member.

13. The valve of claim 1, wherein when the valve is open, the fluid freely enters the drain member without restriction.

14. The valve of claim 7, wherein the tank comprises air and fluid.

15. The valve of claim 14, wherein when the air in the tank provides a negative pressure, the valve enters the open position, allowing air that is external to the tank to enter the drain via the drain member.

16. The valve of claim 1, wherein the valve floats on the fluid when the fluid reaches the level of the bottom of the drain member.

17. A valve for regulating a level of a fluid in a hotwater tank, the valve comprising:
- a drain member having a proximal end and an exit port; and
- a head member, the head member being a one-piece hollow polygonal body and having a hinged top, the hinged top connected to the drain member;
- wherein when the valve is in a closed position, the head member has its distal end flush against the proximal end of the drain member;
- wherein when the valve is in an open position, a space is formed between the distal end of the head member and the proximal end of the drain member allowing the fluid to enter the drain member;
- wherein the valve enters the open position when the fluid reaches the level of a bottom of the drain member, such that an upward pressure pushes against the head member and rotates the head member, allowing the fluid to enter the drain member and exit the valve via the exit port.

18. The valve of claim 17, wherein the valve is made from polypropylene, and wherein the valve has a hollow body.

19. The valve of claim 17, wherein the head member has a volume to weight ratio, said volume to weight ratio allowing the head member to float once the fluid reaches the level of a bottom of the drain member.

20. A system for regulating a level of a fluid in a hotwater tank, the valve comprising:
- a tank for containing the fluid, the tank having an input allowing fluid to enter the tank; and
- a valve, the valve comprising:
    - a head member being a one-piece hollow polygonal body and having a proximal end and a distal end,
    - a drain member having a proximal end and a distal end; and
    - a rotatable member, said rotatable member connecting said head member to said drain member; and
    - wherein when the fluid is below the level of a bottom of the drain member, the valve is in the closed position, and the head member has its distal end flush against the proximal end of the drain member; and
    - wherein when the fluid reaches the level of the bottom of the drain member, the valve is in the open position and a space is formed between the distal end of the head member and the proximal end of the drain member allowing the fluid to enter the drain member.

21. The system of claim 20, wherein when the valve is in the closed position, the system reduces water vapor loss from the tank.

22. The system of claim 20, wherein the valve has a volume to weight ratio, said volume to weight ratio allowing the valve to float on top of the fluid once the fluid reaches the level of the bottom of the drain member.

23. The system of claim 20, wherein the distal end of the drain member is attached to the side of the tank, such that the fluid, when it reaches the level of the bottom of the drain member, drains through the drain member and exits the tank.

24. The system of claim 20, wherein when the valve is in the open position, the fluid freely enters the drain member and exits the tank without restriction.

* * * * *